Oct. 18, 1938.　　　　　J. G. BLUNT　　　2,133,800
LOAD TRANSMITTING DEVICE FOR RAILWAY VEHICLES
Filed June 15, 1937　　　2 Sheets-Sheet 1
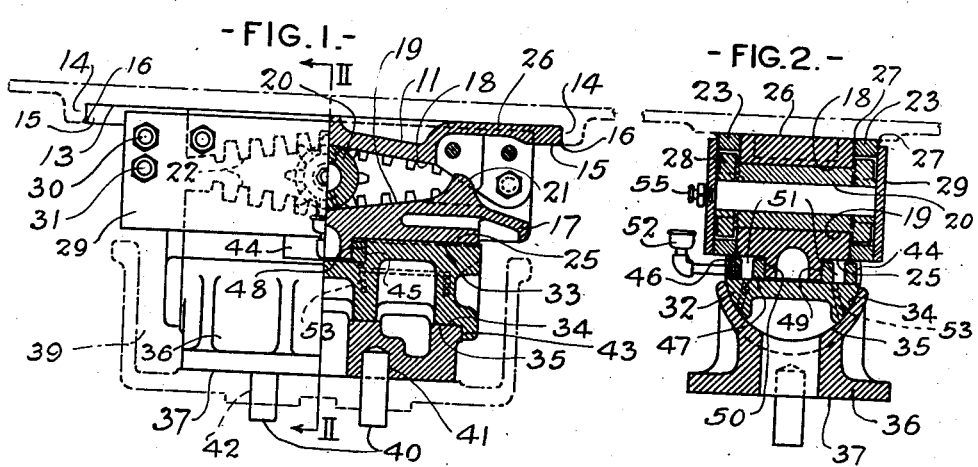
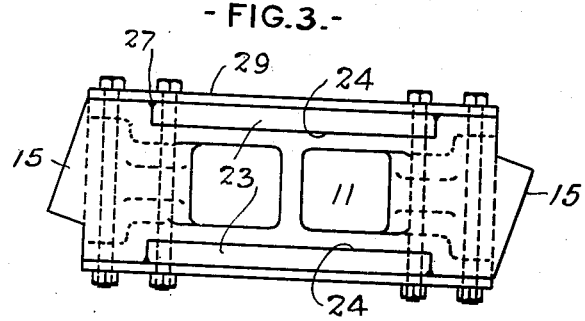
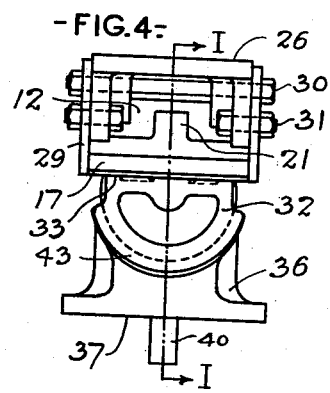
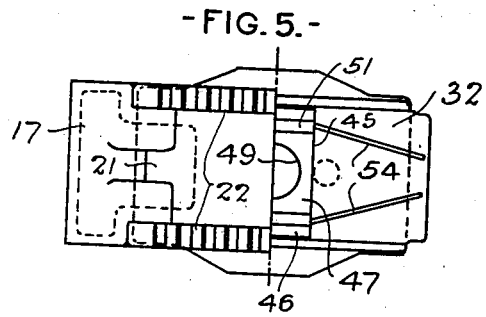
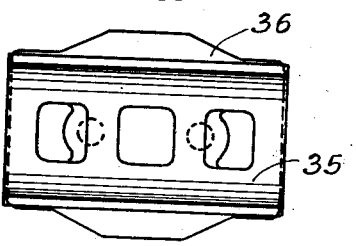
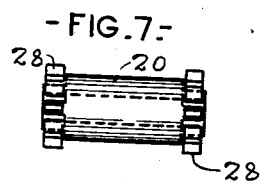
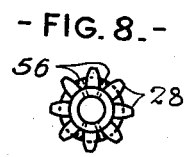
INVENTOR
James G. Blunt
BY
S. C. Yeaton
ATTORNEY Oct. 18, 1938.                J. G. BLUNT                2,133,800
              LOAD TRANSMITTING DEVICE FOR RAILWAY VEHICLES
                    Filed June 15, 1937         2 Sheets-Sheet 2
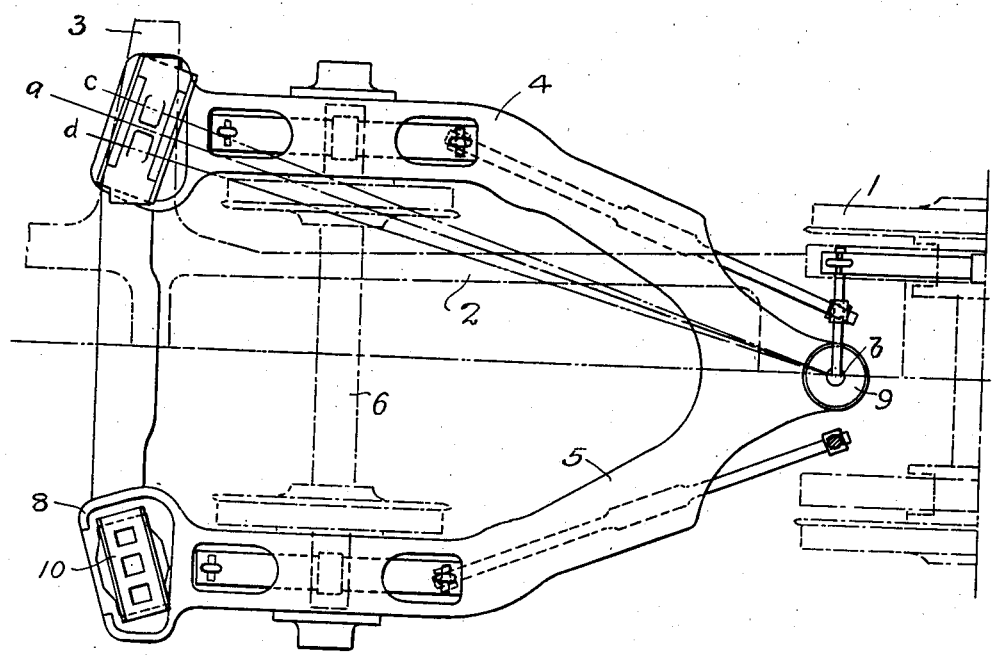
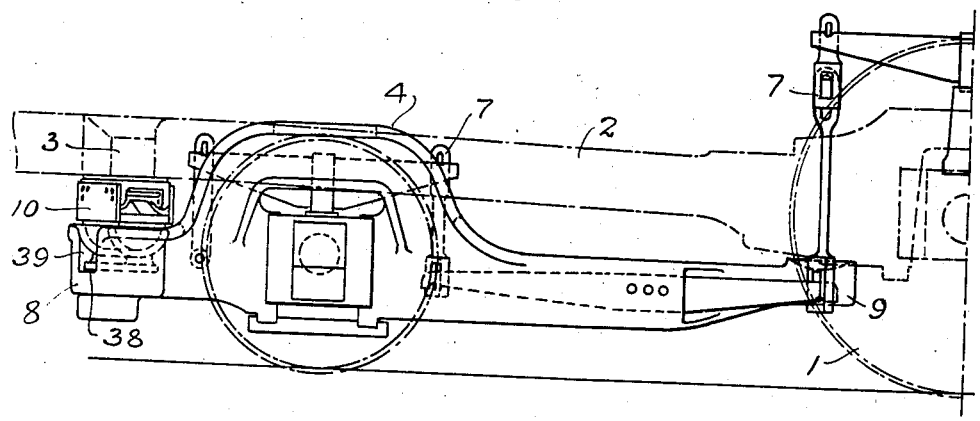
INVENTOR
James G. Blunt
BY
S. C. Yeaton
ATTORNEY Patented Oct. 18, 1938

2,133,800

UNITED STATES PATENT OFFICE 2,133,800

LOAD TRANSMITTING DEVICE FOR RAILWAY VEHICLES

James G. Blunt, Schenectady, N. Y., assignor to American Locomotive Company, New York, N. Y., a corporation of New York Application June 15, 1937, Serial No. 148,252

3 Claims. (Cl. 308—226)

This invention relates to devices for transmitting load of superstructures of railway vehicles, principally locomotives, to a truck forming a part thereof and for permitting relative angular movement between the superstructure and truck.

The invention further relates to devices of the aforesaid characteristics wherein the relative angular movement is subjected to a resistance tending to cushion the movement and assist in restoring the superstructure and truck to their normal relative positions.

A device having the aforesaid characteristics is comprised in Patent No. 1,920,348 granted to the present applicant, and the present invention is an improvement thereover, as will later more fully appear.

Referring to the drawings forming part of this application, Figure 1, at the left, is a side elevation of the device of the present invention, and at the right a section on the line I—I of Fig. 4, portions of the superstructure and truck with which the device is used being shown in dot and dash lines; Fig. 2 is a section of the device on the line II—II of Fig. 1, a portion of the superstructure being shown in dot and dash lines; Fig. 3 is a plan view of the upper roller seat and side plates of the device; Fig. 4 is an end view of the device; Fig. 5, at the left, is a plan view of the left half of the device with the parts above the lower roller seat removed, and at the right is a plan view of the right half similar to that at the left but with the lower roller seat also removed; Fig. 6 is a plan view of the concave cylindrical bearing; Fig. 7 is a side view of the roller; Fig. 8 is an end view of the roller; Fig. 9 is a diagrammatic side elevation of a part of a locomotive showing a radial trailing truck equipped with the device of the present invention, the wheels and a portion of the locomotive frame structure being shown in dot and dash lines; and Fig. 10 is a diagrammatic plan view of the parts shown in Fig. 9, only the left half (as viewed in the direction of the locomotive) of the portion of the locomotive frame structure being shown.

The device of the present invention, broadly speaking, is for supporting a portion of the load of the superstructure of a railway vehicle upon the truck thereof to permit of angular relative movement between the superstructure and truck, as when passing through curved track. It is nevertheless primarily intended for use with a locomotive radial trailing truck and will therefore be described in connection therewith. Furthermore while the device may be used in a position inverted from that shown in Fig. 1, nevertheless it is primarily intended for use in the position shown in Fig. 1 and will therefore be described accordingly.

Referring first to Figs. 9 and 10, here is illustrated a portion of a conventional type of locomotive showing fragmentally a pair of driving wheels 1 and a cradle 2 forming part of the locomotive frame structure, the cradle having side extensions 3 (only one being shown), and a trailing truck indicated generally by the reference numeral 4. The truck comprises a frame 5 and a wheeled axle 6 journalled in the frame 5 in the usual manner to permit relative vertical movement therebetween. A usual type of spring rigging 7, for distributing the load of the superstructure between the driving wheels and truck wheels in the usual manner, is shown. The frame 5 is provided with rear portions 8 normally disposed one beneath each of the extensions 3, and a forward portion 9 disposed beneath and in pivotal engagement with the locomotive frame structure at the longitudinal center thereof thereby providing pivotal means permitting angular movement between the superstructure and truck when the locomotive is passing through curved track. The portions 8 are each spaced from its adjacent extension 3 and within this space is disposed one of the devices of the present invention, indicated generally by the reference numeral 10, thereby transmitting a portion of the load of the superstructure to the truck, the forward portion 9 of the frame 5 supporting another portion of the load of the superstructure. The devices 10 are symmetrically disposed and are set at an angle so that they will be tangent to a circle struck from the pivotal connection of the truck frame as a center.

The locomotive structure as thus far described presents nothing new and is quite similar to that shown in the before mentioned Patent 1,920,348.

The device of the present invention is shown in detail in Figs. 1 to 8 and in describing same when terms such as "longitudinal" and "transverse" are employed it will be understood that they refer to the device rather than to the locomotive unless otherwise specifically stated. As the devices are similar a description of one will suffice.

The device comprises an upper roller seat 11 having its end portions formed to provide longitudinally and centrally disposed slots 12. The lower face of the extension 3 adjacent the device is provided with a groove 13 extending longitudinally of the locomotive, providing thereby side walls 14. The upper seat 11, at its upper face, engages the lower face of the extension 3 within the groove 13, and its ends 15 each engage the wall 14 adjacent thereto to which wall the seat is secured, as by welds 16, the ends 15 being disposed at an angle to the longitudinal center line of the device suitable to position the device at the angle before mentioned.

The lower roller seat 17 is disposed below and in vertical alignment with the upper roller seat 11. The seats are provided with longitudinally extending inner faces 19 and 18 respectively, suitably spaced to accommodate a transversely disposed roller 20 which engages each of the inner faces to roll thereupon when the seats move longitudinally relative to each other, which movement will take place when the locomotive is passing through curved track. The roller provides anti-friction means permitting the relative movement of the seats, but to resist or cushion such movement from normal position and to assist in returning the seats to normal position it is usual, instead of forming the inner faces horizontal, to form each inwardly inclined in a longitudinal direction from the transverse center line, as shown in Fig. 1.

The roller operates in conjunction with the inclined faces in the usual manner, the resistance to movement from normal position and assistance in returning to normal position of the roller and seats (truck and superstructure) depending in extent upon the degree of inclination of the faces.

The lower seat at each end is provided with an upstanding lug 21 (although they may be placed in the upper seat if desired) which is disposed in line with the adjacent slot 12 to permit free relative longitudinal movement of the seats. The lugs serve as stops for the roller 20, thereby limiting the amount of relative longitudinal movement of the seats (relative lateral movement of the truck and superstructure).

It is usual to provide the roller 20 with gear wheels and the seats with racks to insure positive relative movement between these parts. In the present instance the racks 22 are formed on separate plates 23, one at each side of each of the seats proper and fitting within grooves 24 formed in these sides to make, at their outer faces, flush joints with the respective sides. The plates are thus firmly held against longitudinal displacement. The lower faces of the lower rack plates are flush with the lower face of the lower seat proper, the combined lower faces forming the lower face 25 for the lower seat. Likewise the upper faces of the upper rack plates are flush with the upper face of the upper seat proper, the combined upper faces forming the upper face 26 for the upper seat. The upper seat is further secured to the extension 3 adjacent thereto and the upper rack plates to the seat proper by welds 27.

It is desirable to finish the faces 18 and 19 but where the racks are formed integral with the seats proper as in former practice this has not been practical. However in the present instance by forming the rack on separate plates the faces 18 and 19 may be easily finished by a transversely moving cutting tool, and moreover a number of the faces may be finished at the same time.

A gear wheel 28 is disposed at each end of the roller 20, each wheel being in mesh with the upper and lower adjacent racks, and if desired the wheels may be made separate and mounted on reduced portions of the roller and welded thereto so that roller stock of any desired length may be finished at one time and the reduced portions formed and then cut into the desired lengths. The roller is preferably bored throughout its length, as shown.

A plate 29 of substantially the length of the seats and of sufficient height to cross both seats is disposed at each side of the seats. It may be secured to either seat but preferably, as shown, it engages the lower seat to provide a sliding fit therebetween and is secured to the upper seat by upper bolts 30 passing through the upper seat and both plates, and by lower bolts 31 passing through but one plate and the adjacent portion of the seat formed by the adjacent slot 12, thus leaving the slots free for the passage of the lugs 21. By making these plates 29 separate from the upper rack plates 23 the racks are easily cut and moreover a number of these racks may be cut at the same time Making the parts separate, as has been described, effects a material saving in the cost of manufacture and also in the cost of maintenance, and furthermore better results are attained.

The plates 29 maintain the necessary vertical alignment of the seats throughout the longitudinal relative movement thereof. To permit the plates so to function the lower seat is connected with the truck by parts functioning in a manner to permit all of the various relative movements usual in service between the superstructure and truck. To provide for this a bearing 32 having an upper flat face 33 engages at this face the lower face 25 of the lower seat which is likewise formed flat. The bearing has a convex cylindrical lower face 34 which engages a concave cylindrical upper face 35 of a bearing 36. The bearing 36 has a flat lower face 37 which seats upon a flat face 38 formed on the adjacent rear portion 8 of the truck fame 5, the rear portion 8 being formed in the present instance with a pocket 39 to provide sufficient vertical space for the device, the face 38 forming the bottom of this pocket.

Pins 40, two being shown in the present instance, are secured in sockets 41 formed in the bearing 36, the sockets being disposed on the longitudinal center line of the bearing, one at each side of the vertical center plane and at an equidistance therefrom. The pins extend through holes 42 formed in the frame 5 thereby securing the bearing 36 against lateral movement in any direction. The bearing 36 may also be welded, if desired, to the truck frame.

The bearing 32 is provided at the ends with lips 43 which extend over the adjacent ends of the bearing 36, thereby preventing any endwise movement of the bearing 32. The bearings extend longitudinally of the seats when they are in normal positions and the common axis of the cylindrical surfaces is then in the central longitudinal vertical plane of the seats. Furthermore the bearings are of sufficient length and the cylindrical faces of sufficient areas to amply support the seats and to afford a support for the roller directly therebeneath at any position thereof. It will thus be seen that rocking movement between the superstructure and truck will be compensated for by rotative movement between the cylindrical faces about their common axis without in any way disturbing the relative positions of the seats and roller, thus ensuring the desired vertical alignment of the seats. This presents a better and more durable construction than that shown in the aforementioned Patent 1,920,348 wherein the support (rocker) has practically but two points of contact rendering it thereby subject to considerable wear. Furthermore the rocking movement effects an undesirable raising of the superstructure which enhances the wear of the relatively small amount of bearing surfaces.

The bearing 32 is provided at its top with a centrally disposed transverse groove 44 having end walls 45 and side walls 46. The side walls are preferably made of separate strips to facilitate the groove being easily machined. The strips are secured preferably by welding (not shown) and their upper faces are preferably slightly below the face 33 in order that none of the weight of the seats and superstructure will be imposed thereon.

A plate 47 is disposed in the groove 44 with its end walls 48 in sliding engagement with the adjacent faces of the end walls 45. The plate is provided with a centrally disposed cylindrical orifice 49 and the lower seat 17 is formed with a cylindrical boss or pin 50 which fits within the orifice 49. The pin makes a working fit in the orifice of the plate and is slightly spaced at its lower end from the bottom of the groove. Likewise the plate 47 is slightly spaced at its upper face from the lower face 25 of the lower seat so that neither the pin nor the plate will support any of the load. It will thus be seen that the pin and orifice connection permits free rotative movement between the lower seat and the parts thereabove and the bearing 32 and the parts therebelow so that as the superstructure and truck move angularly when entering or leaving curved track the vertical alignment of the seats will not be disturbed. The plate 47 is narrower than the distance between the side walls 46, providing thereby the spaces 51.

Referring to Fig. 10, the line a represents the radial line from the pivot center b which passes through the longitudinal center of the device when in normal position. This line remains fixed as to the upper seat which is rigidly secured to the superstructure. When the truck swings clockwise the radial line for the lower seat and bearings 32 and 36 moves to the position denoted by the letter c, and when the truck swings in the opposite direction the radial line for the lower seat and bearings 32 and 36 moves to the position denoted by the letter d, the positions c and d of the radial line indicating in the present instance the extreme positions for the lower seat. The bearings 32 and 36 move in an arc of a circle about the point b but the lower seat must however move in a straight line to maintain the desired vertical alignment of the seats. Therefore to permit this there must be a slight relative radial movement between the lower seat and bearings. This is provided for by the spaces 51 which allow the plate 47 to slide in a transverse direction in the groove, or in other words permits the required amount of relative transverse movement between the seats and the bearings.

With the parts disposed as shown, that is to say with the seats 11 and 17 serving respectively as the upper and lower seats the groove 44 serves as an oil receptacle, and an oil cup 52 leads into this receptacle for supplying it with lubricant. The bearing faces of the plate 47 and pin 50 are thus lubricated and orifices 53 are provided in the bearing 32 leading to the cylindrical faces for lubricating same; also the upper face 33 is provided with oil grooves 54 leading from the spaces 51 providing means for lubricating the engaging faces 25 and 33. A grease connection 55 extends through one of the plates 29 in line with the bore in the roller when the roller is in normal position for feeding lubricant to the bore, and orifices 56 are provided in the roller for supplying grease to the gear wheels and racks.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A device for interposition between a railway vehicle superstructure portion and a truck portion for transmitting a part of the load of the former to the latter, said superstructure and truck being connected to permit angular movement between said portions, comprising an upper roller seat; a lower roller seat, said seats being in vertical alignment and movable relatively in a direction longitudinally thereof and having inner faces for engagement with a roller, and outer faces, one of said outer faces being adapted for rigid engagement with one of said portions and the other being flat; means maintaining said vertical alignment; a roller engaging said inner faces and disposed transversely thereof to roll during said relative movement; a bearing having a convex cylindrical face and an oppositely disposed flat face engaging said seat flat face, one of said flat faces being provided with a groove having parallel transverse side walls and the other face having a cylindrical boss; a bearing having a concave cylindrical face engaging said convex cylindrical face and a face opposite thereto adapted for rigid engagement with the other of said portions; and a plate having a cylindrical orifice in which said boss is disposed, said plate being disposed in said groove for sliding transverse movement relative thereto and having side faces engaging said groove side walls to prevent longitudinal movement thereof relative to said groove.

2. A device for interposition between a railway vehicle superstructure portion and a truck portion for transmitting a part of the load of the former to the latter, said superstructure and truck being connected to permit angular movement between said portions, comprising an upper roller seat; a lower roller seat, said seats being in vertical alignment and movable relatively in a direction longitudinally thereof and having inner faces for engagement with a roller, and outer faces, the outer face of said upper seat being adapted for rigid engagement with said superstructure portion and the outer face of said lower seat being flat; means maintaining said vertical alignment; a roller engaging said inner faces and disposed transversely thereof to roll during said relative movement; a bearing having a lower convex cylindrical face and an upper oppositely disposed flat face engaging said seat flat face, said bearing flat face being formed with a walled groove providing a receptacle for lubricant, two of the walls of the groove being parallel and directed transversely to provide guides, and the flat face of said lower seat having a cylindrical boss; a bearing having a concave cylindrical face engaging said convex cylindrical face and a face opposite thereto adapted for rigid engagement with said truck portion; and a plate having a cylindrical orifice in which said boss is disposed, said plate being disposed in said groove for sliding transverse movement relative thereto and having side faces engaging said parallel walls to prevent longitudinal movement thereof relative to said groove.

3. A device for interposition between a railway vehicle superstructure portion and a truck portion for transmitting a part of the load of the former to the latter, said superstructure and truck being connected to permit angular movement between said portions, comprising an upper roller seat; a lower roller seat, said seats being in vertical alignment and movable relatively in a direction longitudinally thereof and having inner faces for engagement with a roller, and outer faces, one of said outer faces being adapted for rigid engagement with one of said portions; a roller engaging said inner faces and disposed transversely thereof to roll during said relative movement; means connected to the other of said outer faces and to the other of said portions providing a flexible connection therebetween whereby said seats will maintain said vertical alignment during angular, rocking or longitudinal relative movement between said portions; a gear wheel at each end of said roller; a plate secured to each side of each of said seats, each plate having teeth forming a rack in engagement with the gear wheel adjacent thereto; and a plate extending across said seats at each side thereof and secured to one of said seats for maintaining said vertical alignment.

JAMES G. BLUNT.